US 6,546,333 B2

(12) United States Patent
Tanaka et al.

(10) Patent No.: US 6,546,333 B2
(45) Date of Patent: Apr. 8, 2003

(54) CAR NAVIGATION APPARATUS, TRAFFIC INFORMATION PROVIDING APPARATUS, PROGRAM RECORDING MEDIUM FOR CAR NAVIGATION APPARATUS, AND PROGRAM RECORDING MEDIUM FOR TRAFFIC INFORMATION PROVIDING APPARATUS

(75) Inventors: Eiichi Tanaka, Kanagawa (JP); Akira Shinada, Tokyo (JP); Masayasu Ito, Chiba (JP); Makoto Sasaki, Chiba (JP); Shigeru Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/918,943

(22) Filed: Jul. 31, 2001

(65) Prior Publication Data

US 2002/0049531 A1 Apr. 25, 2002

(30) Foreign Application Priority Data

Aug. 1, 2000 (JP) ........................................ 2000-232661

(51) Int. Cl.$^7$ ................................................ G01C 21/00
(52) U.S. Cl. .................. 701/207; 701/214; 342/357.09; 342/357.1; 340/991; 340/993
(58) Field of Search ................................. 701/201, 207, 701/213, 214, 215; 340/988, 906, 907, 993, 991; 342/357.01, 357.03, 357.09, 357.1

(56) References Cited

U.S. PATENT DOCUMENTS 5,926,113 A * 7/1999 Jones et al. .................. 340/906

* cited by examiner

Primary Examiner—Yonel Beaulieu
(74) Attorney, Agent, or Firm—Frommer Lawrence & Haug LLP; William S. Frommer; Glenn F. Savit

(57) ABSTRACT

Providing a car navigation apparatus which can always detect a position of a car with high accuracy, and can obtain traffic information in a practical manner. The car navigation apparatus according to the present invention obtains the DGPS correction data from a base station nearest the car in two-way radio communication instead of obtaining the DGPS correction data by receiving the FM broadcasting. Accordingly, the current position of the car can always be detected with high accuracy. Furthermore, the car navigation apparatus according to the present invention obtains traffic information by having access to a traffic information providing system in two-way radio communication instead of obtaining traffic information by receiving the FM broadcasting. So, the car navigation apparatus can obtain traffic information near the current position selectively or according to the priority. Accordingly, the car navigation apparatus can promptly obtain traffic information when necessary, and can obtain necessary traffic information promptly.

8 Claims, 8 Drawing Sheets

CAR NAVIGATION APPARATUS, TRAFFIC INFORMATION PROVIDING APPARATUS, PROGRAM RECORDING MEDIUM FOR CAR NAVIGATION APPARATUS, AND PROGRAM RECORDING MEDIUM FOR TRAFFIC INFORMATION PROVIDING APPARATUS

BACKGROUND OF THE INVENTION

1. Field of the Invention

The present invention relates to a car navigation apparatus which can always detect a position of a car with high accuracy, a car navigation apparatus which can obtain traffic information in a practical manner, a traffic information providing apparatus for providing a car navigation apparatus with traffic information in a practical manner, and program recording media for realizing those apparatuses.

2. Description of Related Art

Generally, a car navigation apparatus detects a position of a car by the use of the GPS (Global Positioning System). The car position data detected by the GPS has some errors due to environmental conditions.

So, the DGPS (differential GPS) which improves the accuracy of measuring a position of a car is used. In the DGPS, a base station (FM broadcasting station etc.) which has obtained data of a correct car position in advance measures a car position using the GPS, and transmits the difference therebetween to the car as correction data. Then, the car position measured by the car using the GPS is corrected by using the transmitted correction data.

Conventionally, the correction data of the DGPS (the correction data used in the DGPS) is transmitted by the FM multiplex broadcasting.

So, the conventional car navigation apparatus obtains the DGPS correction data by receiving the FM broadcasting and decodes DGPS signals multiplexed into the FM broadcasting to convert the DGPS signals to the DGPS correction data.

On the other hand, systems for providing a car navigation apparatus with traffic information such as the VICS (Vehicle Information and Communication System) come into practical use.

The traffic information providing system such as the VICS transmits traffic information such as traffic congestions, traffic accidents, traffic regulations and parking lots by the FM multiplex broadcasting.

So, the conventional car navigation apparatus obtains the traffic information such as traffic congestions, traffic accidents, traffic regulations and parking lots and outputs the traffic information by receiving the FM broadcasting and decodes the VICS signals multiplexed into the FM broadcasting to convert the VICS signals to character data. On the other hand, the traffic information can be obtained from beacons (information communication terminals) disposed on roads.

In this way, the conventional car navigation apparatus obtains the DGPS correction data and traffic information by receiving the FM broadcasting.

However, in obtaining the DGPS correction data by receiving the FM broadcasting, in case the car navigation apparatus is distant from the FM broadcasting stations (which are limited in number) or the state of radio waves of the FM broadcasting is deteriorated, it becomes difficult to obtain the DGPS correction data or it takes a considerably long time before the DGPS correction data has been received.

So, the DGPS sometimes does not work, which deteriorates the measurement accuracy.

Also, in case the car navigation apparatus is distant from the FM broadcasting stations, only the DGPS correction data of distant FM broadcasting stations can be obtained, which can not perform correcting operation with accuracy.

Furthermore, in obtaining the traffic information by receiving the FM broadcasting, in case the car navigation apparatus is distant from the FM broadcasting stations (which are limited in number) or the state of radio waves of the FM broadcasting is deteriorated, it becomes difficult to obtain the traffic information or it takes a considerably long time before the traffic information has been received.

So, sometimes the necessary traffic information cannot be obtained when required.

Furthermore, in obtaining the traffic information by receiving the FM broadcasting, since the traffic information is transmitted in one-way radio communication or the traffic information is transmitted only from the FM broadcasting stations, the desired traffic information cannot be obtained selectively or according to the priority.

SUMMARY OF THE INVENTION

It is therefore an object of the present invention to overcome the above-mentioned drawbacks by providing a new car navigation apparatus which can always detect a position of a car with high accuracy, a new car navigation apparatus which can obtain traffic information in a practical manner, a new traffic information providing apparatus for providing a car navigation apparatus with traffic information in a practical manner, and new program recording media for realizing those apparatuses.

According to the present invention, there is provided a car navigation apparatus that detects and corrects a current position of a motor vehicle by the use of radio communication. A preliminary current position of the vehicle is detected. At least one base station is detected out of base stations near the detected preliminary current position of the vehicle using information of positions of a plurality of base stations which have been registered in map data in advance. A correction data request is transmitted to the detected base station. Correction data is transmitted from the detected base station in response to the request, received by the navigation apparatus, and a corrected current position of the vehicle is corrected by correcting the preliminary current position using the received correction data.

Specifically, the function of the car navigation apparatus can be realized by executing a program, and the program can be stored in an appropriate recording medium such as a semiconductor memory whose data can be read out by a computer.

The car navigation apparatus obtains the correction data for use in correcting the position information detected using the radio determination from a base station which is nearest the car in two-way radio communication, and corrects the current position information detected using the radio determination.

Thus, the car navigation apparatus according to the present invention obtains the DGPS correction data from a base station nearest the car in two-way radio communication instead of obtaining the DGPS correction data by receiving the FM broadcasting. So, the car navigation apparatus can promptly obtain the DGPS correction data when necessary, which is capable of correcting a car position with high accuracy. Accordingly, the current position of the car can always be detected with high accuracy.

Furthermore, according to the present invention, there is provided a car navigation apparatus, including:

means for detecting current position information of a car by the use of the radio determination;

means for setting up destination information and/or route information to the destination;

means for designating the current position information detected by the detecting means and/or the set up information set up by the setting up means, and transmitting traffic information providing request to an external traffic information providing system;

means for receiving traffic information transmitted in response to the traffic information providing request from the traffic information providing system; and means for outputting the received traffic information.

Furthermore, according to the present invention, there is provided a traffic information providing apparatus, including:

means for storing traffic information to be presented to a car navigation apparatus;

means for receiving traffic information providing request from the car navigation apparatus, the traffic information providing request being issued when at least a piece of information among current position information of a car, destination information, and route information to the destination is designated;

means for extracting only traffic information highly associated with the information designated by the traffic information providing request from the traffic information to be presented to the car navigation apparatus, or deciding the priority of the traffic information to be presented to the car navigation apparatus in accordance with degree of association with the designated information; and means for transmitting the extracted traffic information, or transmitting the traffic information in accordance with order of the priority to the car navigation apparatus which issued the traffic information providing request.

Specifically, the function of the car navigation apparatus and traffic information providing apparatus can be realized by executing a program, and the program can be stored in an appropriate recording medium such as a semiconductor memory whose data can be read out by a computer.

In the car navigation system according to the present invention, the car navigation apparatus according to the present invention designates at least a piece of information among current position information of a car, destination information, and route information to the destination, and issues the traffic information providing request to the traffic information providing apparatus in two-way radio communication. On receiving the traffic information providing request, the traffic information providing apparatus according to the present invention returns only traffic information highly associated with the information designated by the traffic information providing request, or returns traffic information in order of the priority in accordance with degree of association with the information designated by the traffic information providing request to the car navigation apparatus which issued the traffic information providing request.

Thus, the car navigation apparatus according to the present invention obtains traffic information by having access to a traffic information providing system in two-way radio communication instead of obtaining traffic information by receiving the FM broadcasting. So, the car navigation apparatus can promptly obtain traffic information when necessary.

Furthermore, with the traffic information providing apparatus according to the present invention being provided, the car navigation apparatus according to the present invention can obtain necessary traffic information promptly since the car navigation apparatus can obtain traffic information selectively or according to the priority in accordance with circumstances a car is facing.

These objects and other objects, features and advantages of the present invention will become more apparent from the following detailed description of the preferred embodiments of the present invention when taken in conjunction with the accompanying drawings.

DESCRIPTION OF THE PREFERRED EMBODIMENTS

Preferred embodiments according to the present invention will further be described below with reference to the accompanying drawings.

Figure 1:
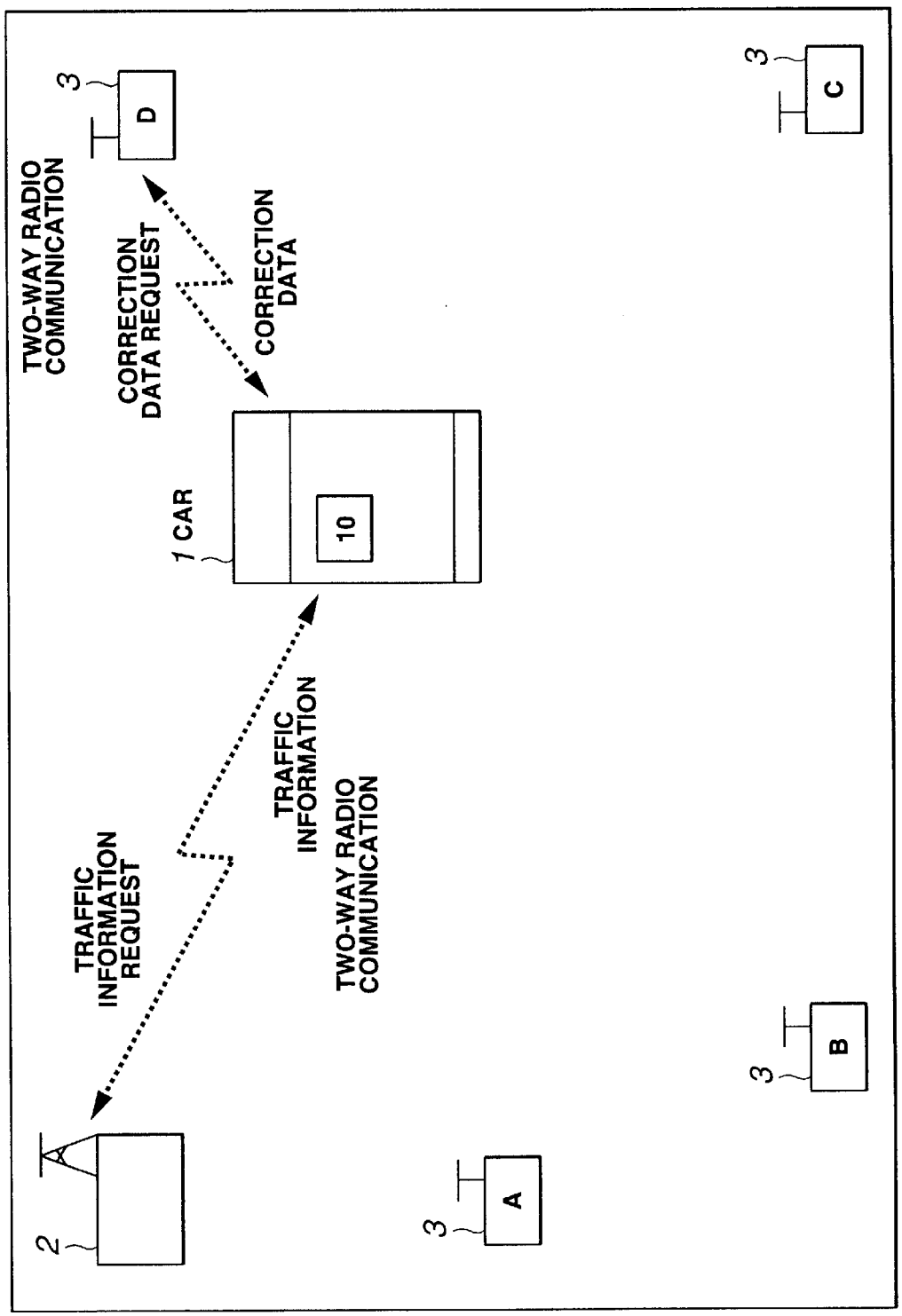
FIG. 1 shows one example of the preferred embodiment according to the present invention.

FIG. 1 shows one example of the preferred embodiment according to the present invention.

As shown, a car 1 which has mounted thereto a car navigation apparatus 10 according to the present invention obtains traffic information from a traffic information providing system 2 in two-way radio communication, and obtains the DGPS correction data from a base station 3 nearest the car 1 among a plurality of base stations 3 in two-way radio communication.

Each of the base stations 3 can compute the DGPS correction data from the difference between data of a correct car position which has been obtained in advance and data of a car position measured using the GPS.

In FIG. 1, the car navigation apparatus 10 mounted to the car 1 obtains the DGPS correction data by performing two-way radio communication with the base station 3 (D) nearest the car 1 among four base stations 3 (A, B, C, and D).

Figure 2:
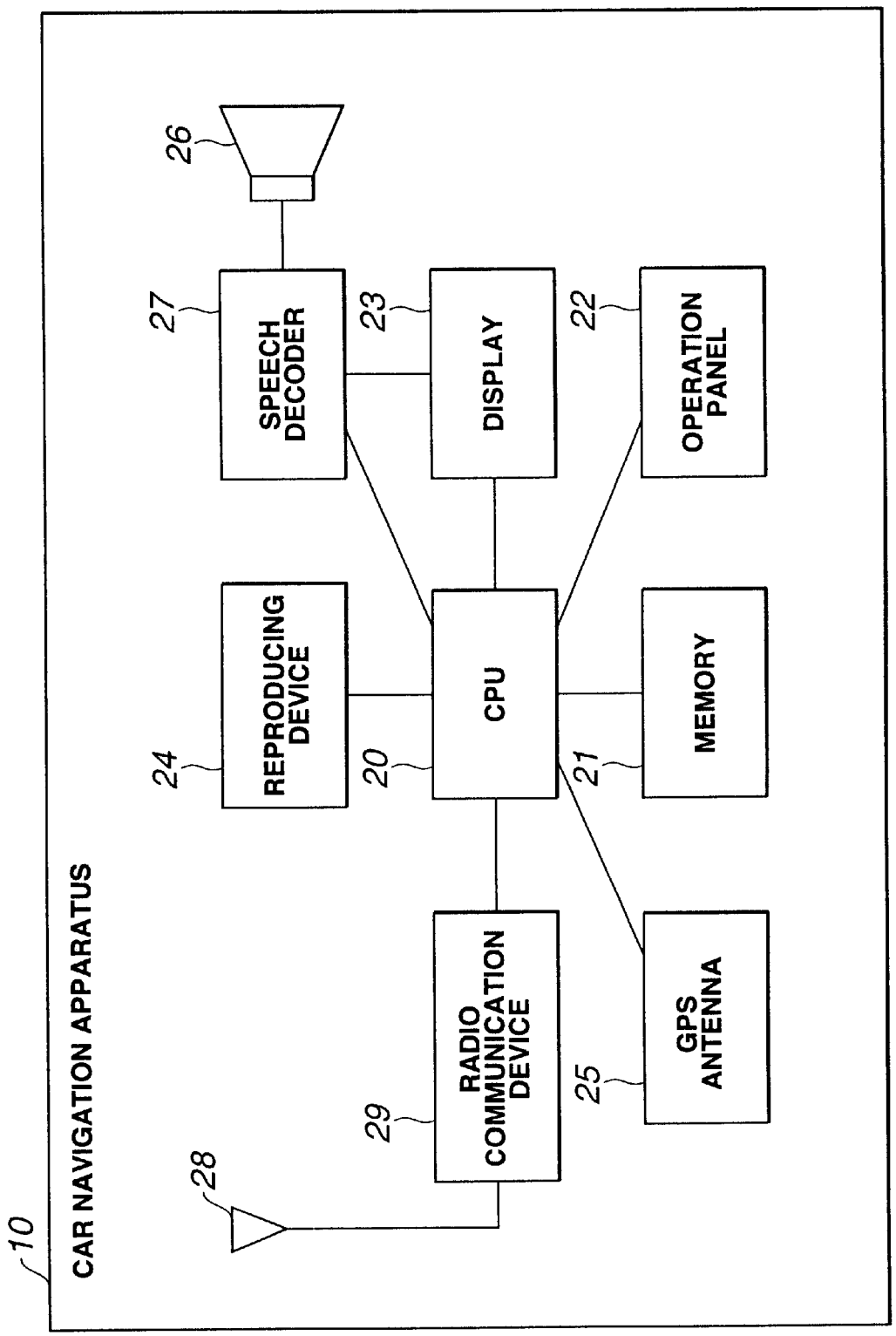
FIG. 2 shows a block diagram of the car navigation apparatus 10 according to the present invention.

FIG. 2 shows a block diagram of the car navigation apparatus 10 according to the present invention.

As shown, similar to the conventional car navigation apparatus, the car navigation apparatus 10 includes a CPU 20, a memory 21, an operation panel 22 for receiving requests from the user, a display 23 for displaying information such as map data, a reproducing device 24 for reproducing data recorded on a recording medium (for recording map data etc.) such as a CD-ROM, DVD-ROM, or hard disc, a GPS antenna 25 for receiving GPS information from a plurality of communication satellites, a loud speaker 26 for outputting speeches, a speech decoder 27 for generating speeches to be output from the loud speaker 26, and a radio communication device 29 which may be an information communication terminal having a radio communication antenna 28.

Figure 3:
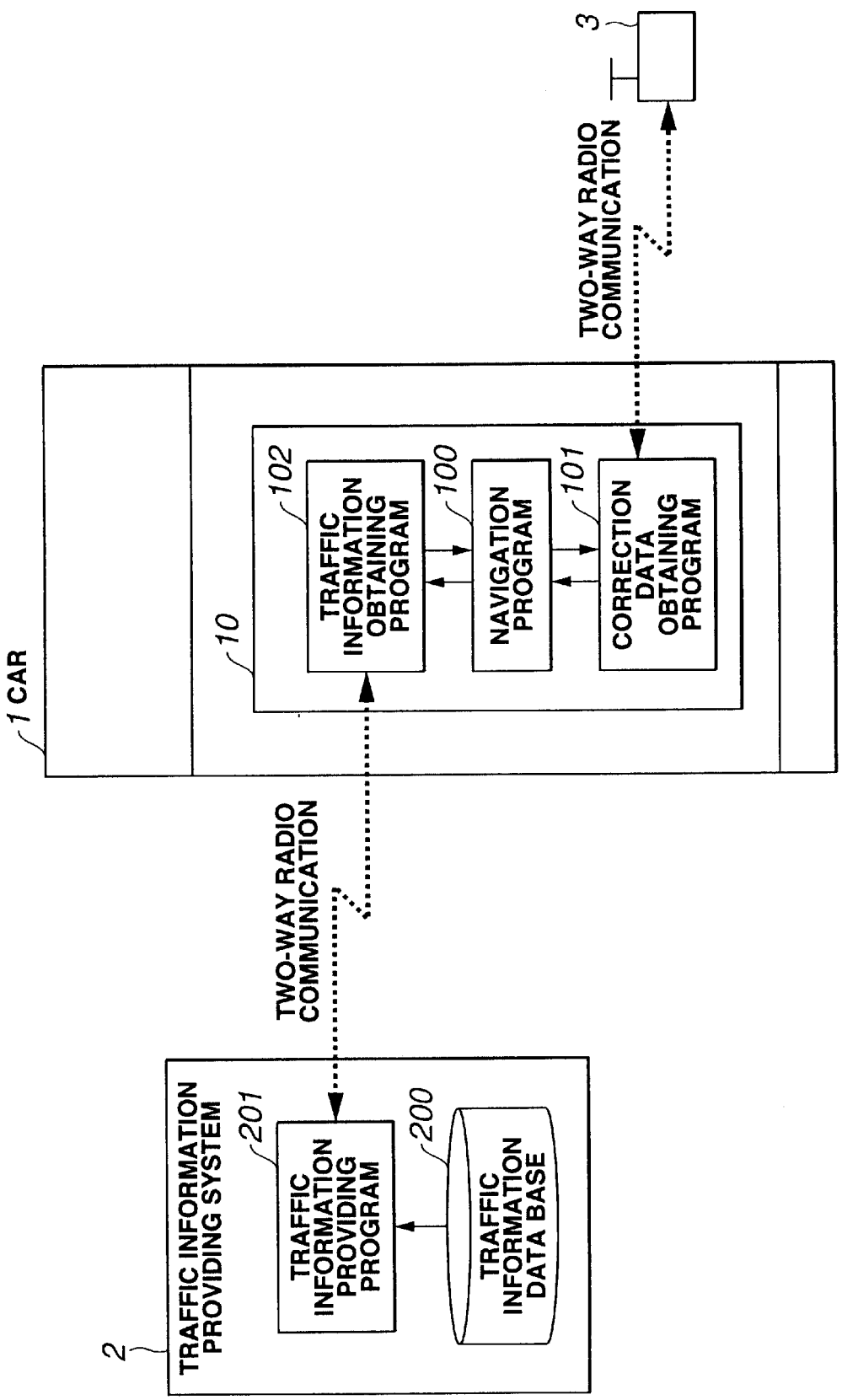
FIG. 3 shows the configuration of programs of the car navigation apparatus, and the configuration of programs of the traffic information providing system.

FIG. 3 shows the configuration of programs of the car navigation apparatus 10, and the configuration of programs of the traffic information providing system 2.

As shown, the car navigation apparatus 10 includes, as programs to be performed by the CPU 20, a navigation program 100 for performing navigation using the GPS information received by the GPS antenna 25, a correction data obtaining program 101 for obtaining the DGPS correction data necessary for the navigation program 100, and a traffic information obtaining program 102 for obtaining traffic information from the traffic information providing system 2.

The navigation program 100, correction data obtaining program 101, and traffic information obtaining program 102 can be stored in an appropriate recording medium such as a semiconductor memory whose data can be read out by a computer.

On the other hand, the traffic information providing system 2 includes a traffic information data base 200 for managing traffic information required by the car navigation apparatus 10, and a traffic information providing program 201 for providing the car navigation apparatus 10 with traffic information.

The traffic information providing program 201 can be stored in an appropriate recording medium such as a semiconductor memory whose data can be read out by a computer.

The navigation program 100 obtains a correct current position of the car 1 by computing a current position of the car 1 using the GPS information received by the GPS antenna 25 and correcting the computed current car position using the DGPS correction data obtained from the base station 3.

In obtaining the correct current car position, the navigation program 100 instructs the correction data obtaining program 101 to obtain the DGPS correction data.

Figure 4:
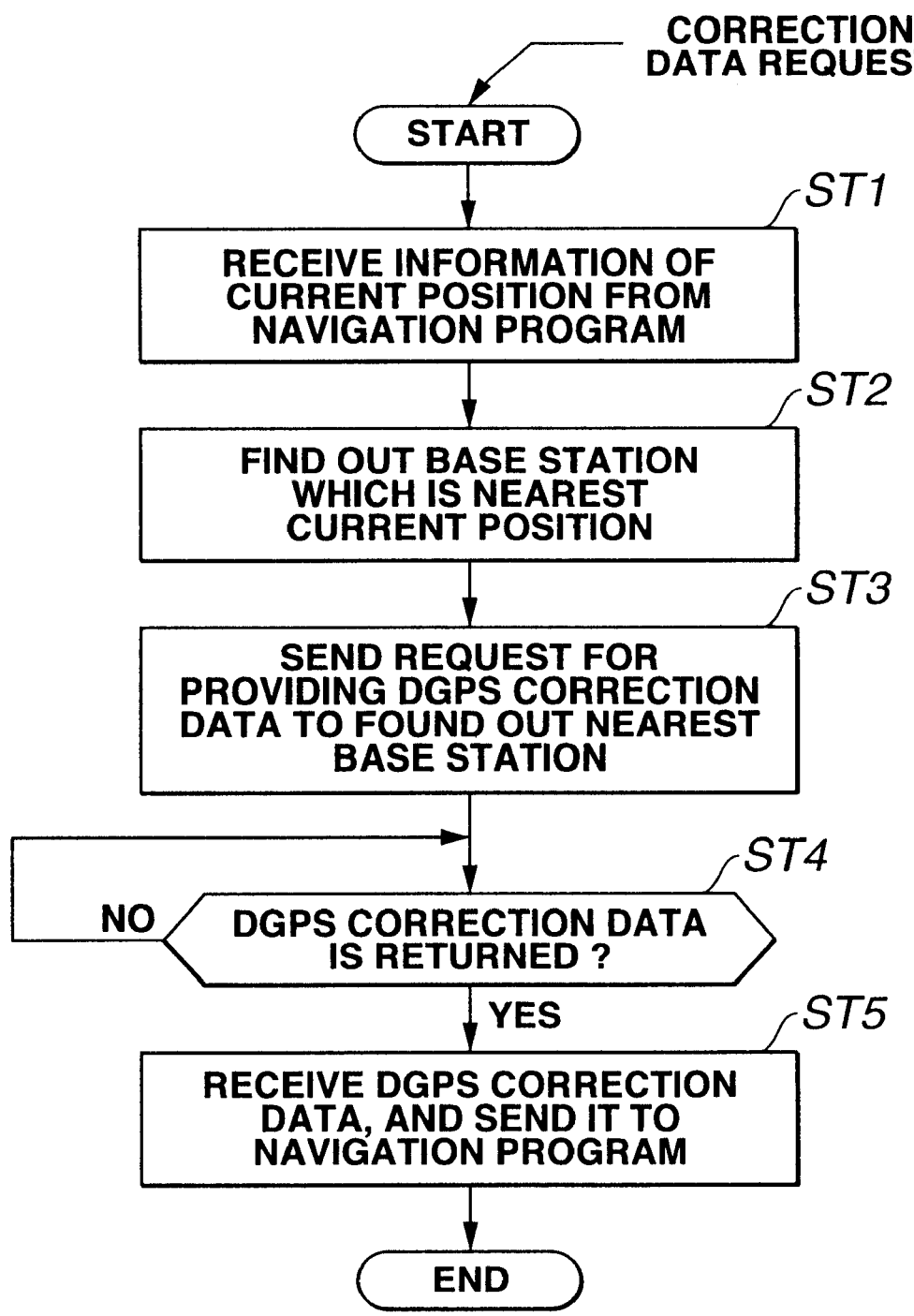
FIG. 4 shows a flow chart whose precessing steps are performed by a correction data obtaining program.

On receiving the obtaining instruction, the correction data obtaining program 101 obtains the DGPS correction data from the base station 3 and sends the DGPS correction data to the navigation program 100 by performing a series of precessing steps shown in a flow chart in FIG. 4.

As shown in FIG. 4, at first, the correction data obtaining program 101 receives information of the current position from the navigation program 100, in step 1. The information of the current position may be computed using the DGPS correction data, or may be computed without using the DGPS correction data.

Next, the correction data obtaining program 101 finds out a base station 3 which is nearest the current position using the information of the current position obtained from the navigation program 100 and information of positions of the base stations 3 which have been registered in the map data in advance, in step 2. Then, the correction data obtaining program 101 sends a request for providing the DGPS correction data to the found out nearest base station 3 in two-way radio communication.

Then, the DGPS correction data is returned from the nearest base station 3 while waiting for the return, in step 4.

Finally, the correction data obtaining program 101 receives the DGPS correction data, and sends it to the navigation program 100, in step 5.

In this way, the car navigation apparatus 10 obtains the DGPS correction data from a base station 3 which is nearest the car 1 in two-way radio communication instead of obtaining the DGPS correction data by receiving the FM broadcasting.

So, the car navigation apparatus 10 can promptly obtain the DGPS correction data when necessary, which is capable of correcting a car position with high accuracy. Thus, the current position of the car 1 can always be detected with high accuracy.

As described above, in performing the precessing steps shown in the flow chart in FIG. 4, the correction data obtaining program 101 finds out a base station 3 nearest the current position by it self from which the correction data obtaining program 101 receives the DOPS correction data by using the map data. On the other hand, the DGPS correction data can be obtained without performing such precessing steps.

For example, in a mobile communication system such as the PDC (Personal Digital Cellular), a service area is divided into a plurality of small cells, and a base station is disposed at each of the cells. And each base station transmits radio waves of small power so that the radio waves are transmitted only within a range of its own cell. Thus, finite resources of the radio waves can be utilized effectively.

In such a mobile communication system, a hand over controlling is performed, under which, when a movable body moves from a cell to another cell, the base station of the former cell is switched to that of the latter cell.

In performing the hand over controlling, the movable body measures a receiving level of a carrier of a cell being under communication and those of carriers of adjacent cells, and transmits the measurement result to its current base station. When there is found an adjacent cell whose carrier has a higher receiving level than that of the carrier of the cell being under transmission, the current base station inquired of a base station of the adjacent cell whose carrier has higher receiving level whether there exists a vacant channel to decide a communication channel.

Thus, the hand over controlling has a function of realizing a base station of a cell to which the car 1 being under transmission belongs.

Figure 5:
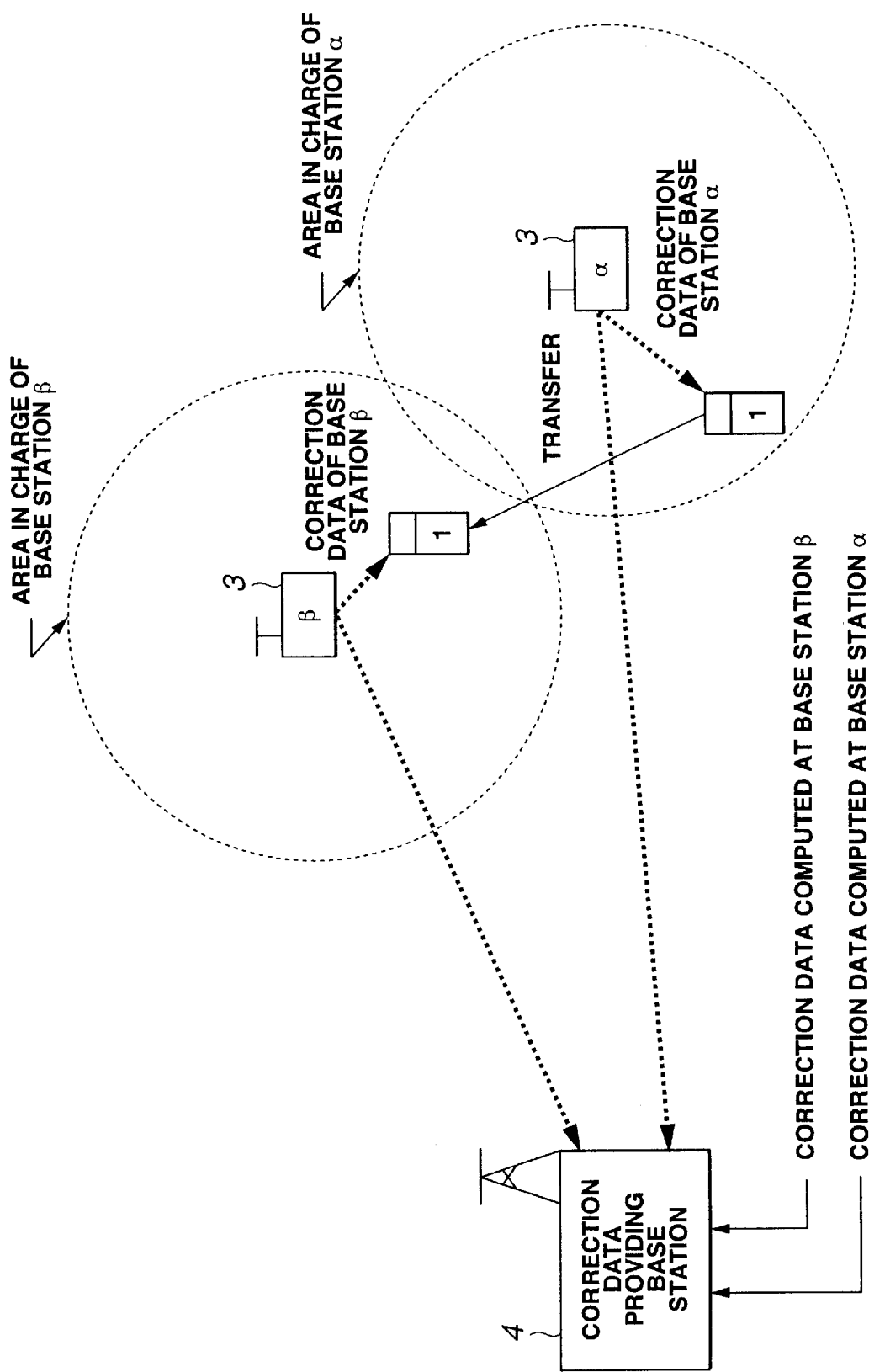
FIG. 5 shows an explanation view for obtaining the DGPS correction data.

So, as shown in FIG. 5, the correction data obtaining program 101 performs radio communication with a correction data providing base station 4 to make the correction data providing base station 4 realize which base station 3 the car 1 belongs to. Then, the correction data obtaining program 101 makes the correction data providing base station 4 transmit the DGPS correction data obtained by the base station 3 being under communication to itself. Thus, the correction data obtaining program 101 can obtain the DGPS correction data without finding out the base station 3 by itself.

Figure 6:
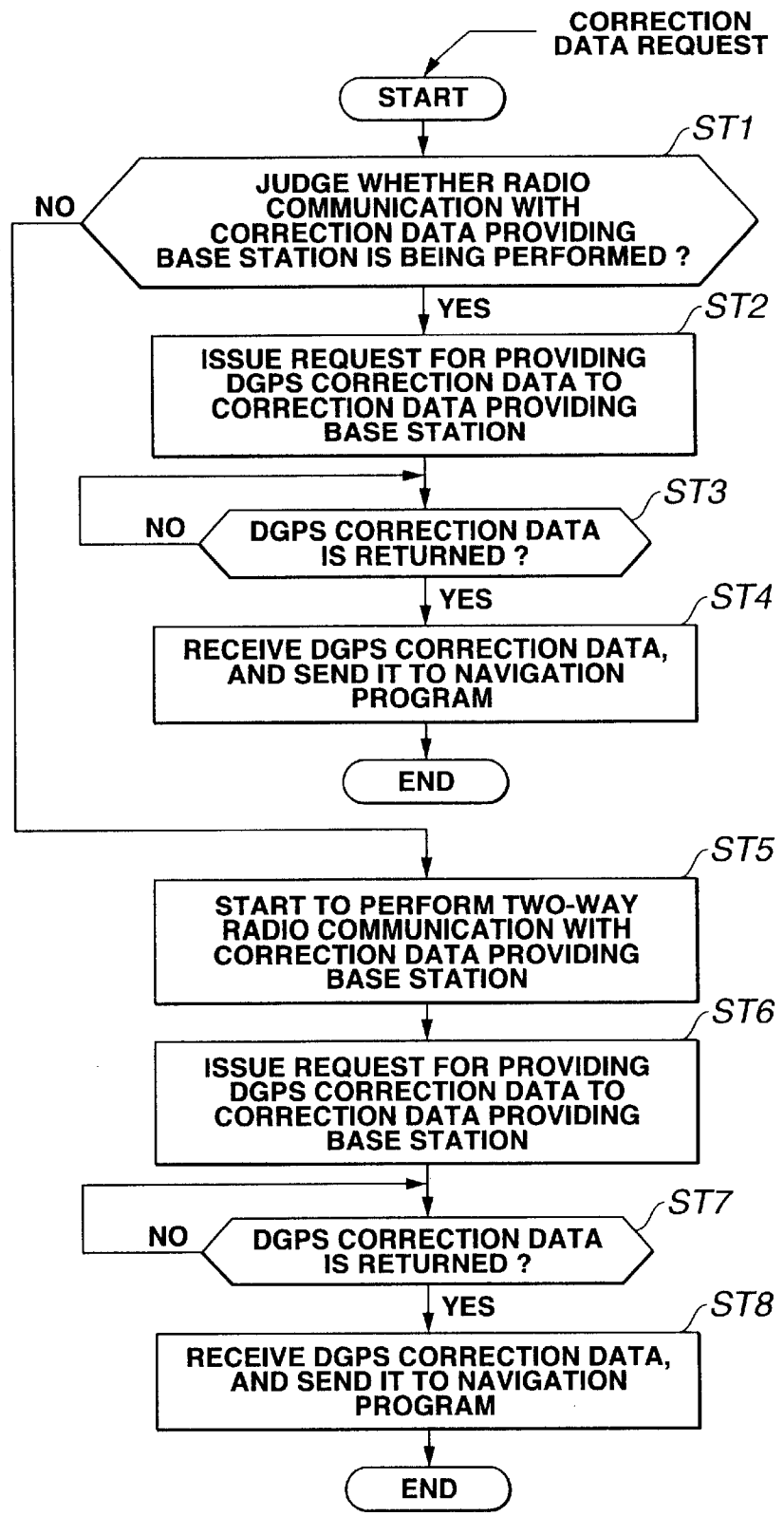
FIG. 6 shows a flow chart whose precessing steps are performed by the correction data obtaining program.

In this case, the correction data obtaining program 101 obtains the DGPS correction data by performing a series of precessing steps shown in a flow chart in FIG. 6.

As shown in FIG. 6, when an instruction for obtaining the DGPS correction data is issued, at first, the correction data obtaining program 101 judges whether radio communication with the correction data providing base station 4 is being performed or not, in step 1. In case it is found that the correction data obtaining program 101 is communicating with the correction data providing base station 4, next, the correction data obtaining program 101 issues a request for providing the DGPS correction data to the correction data providing base station 4, in step 2.

Then, the DGPS correction data is returned in response to the providing request while waiting for the return, in step 3. Finally, the correction data obtaining program 101 receives the DGPS correction data (the DGPS correction data computed at a base station 3, to which cell the car 1 belongs), and sends it to the navigation program 100, in step 4.

On the other hand, in case it is found that the correction data obtaining program 101 is not communicating with the correction data providing base station 4, next, the correction data obtaining program 101 starts to perform two-way radio communication with the correction data providing base station 4, in step 5. Then, the correction data obtaining program 101 issues a request for providing the DGPS correction data to the correction data providing base station 4, in step 6.

Then, the DGPS correction data is returned in response to the providing request while waiting for the return, in step 7. Finally, the correction data obtaining program 101 receives the DGPS correction data (the DGPS correction data computed at a base station 3, to which cell the car 1 belongs), and sends it to the navigation program 100, in step 8.

Thus, the correction data obtaining program 101 can obtain the DGPS correction data without finding out a base station 3 (a base station 3 nearest the current position) by it self from which the correction data obtaining program 101 receives the DGPS correction data.

Figure 7:
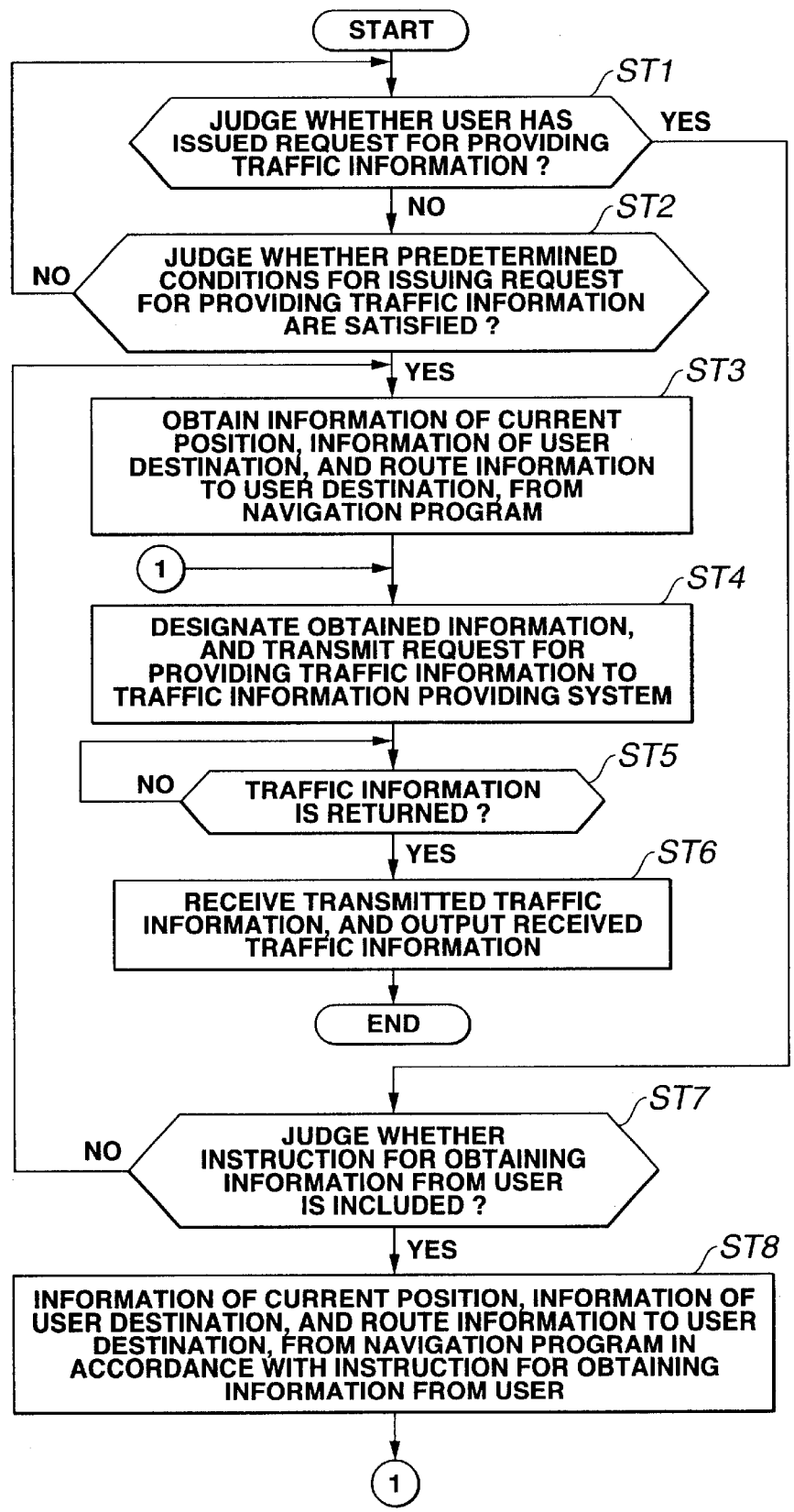
FIG. 7 shows a flow chart whose precessing steps are performed by a traffic information providing program.
Figure 8A:
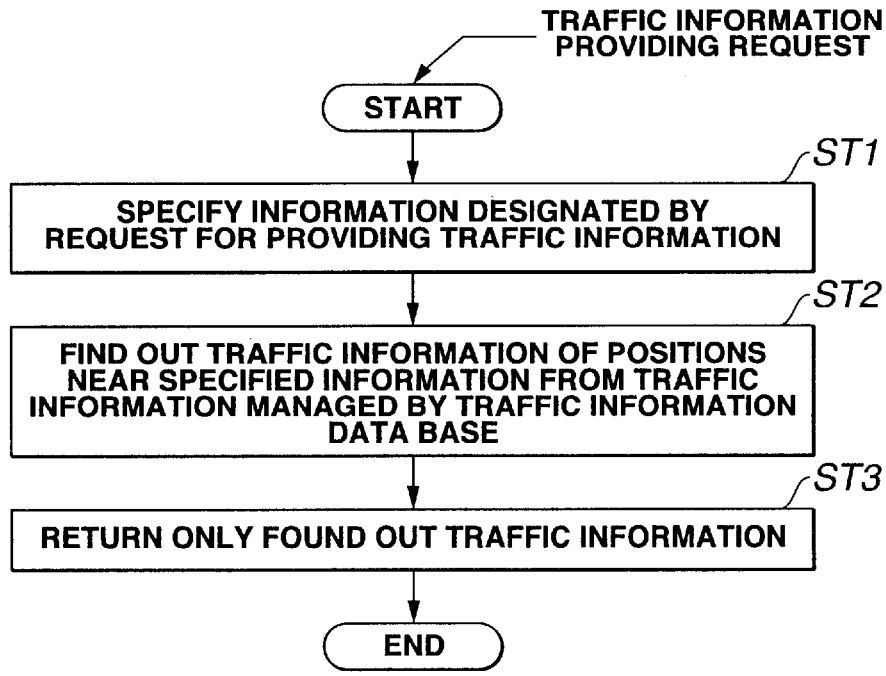
FIGS. 8A and 8B each shows a flow chart whose precessing steps are performed by a traffic information providing program.
Figure 8B:
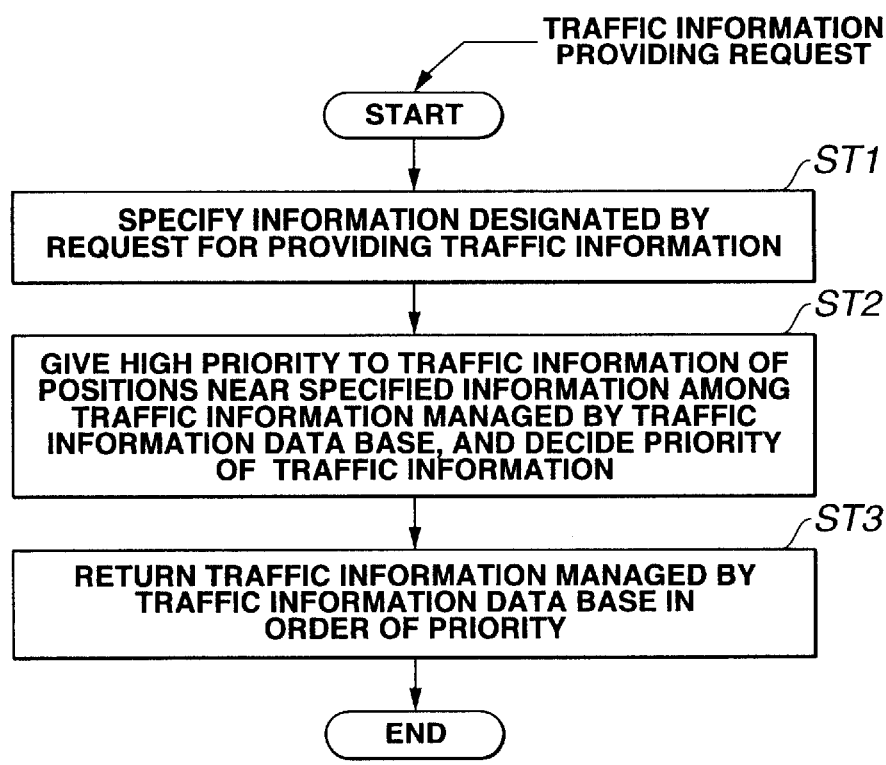

FIG. 7 shows a flow chart, in which a series of precessing steps to be performed by the traffic information obtaining program 102 of the car navigation apparatus 10 is shown. FIGS. 8A and 8B each shows a flow chart, in which a series of precessing steps to be performed by the traffic information providing program 201 of the traffic information providing system 2 is shown.

Next, with reference to the flow charts, the processing steps for effectively providing the user with traffic information will be explained in detail.

When the traffic information obtaining program 102 of the car navigation apparatus 10 is executed, as shown in FIG. 7, at first, the traffic information obtaining program 102 judges whether the user aboard the car 1 has issued a request for providing traffic information or not, in step 1. In case it is found that the user has not issued the request for providing traffic information, next, the traffic information obtaining program 102 judges whether predetermined conditions for issuing the request for providing traffic information, that is, if the car navigation apparatus 10 is working or if the request is issued during a prescribed period, are satisfied or not, in step 2. In case it is found that the conditions are not satisfied, the processing returns to the step 1.

Then the step car 1 and step 2 are repeated. In case it is found that the predetermined conditions for issuing the request for providing traffic information are satisfied, the traffic information obtaining program 102 obtains information of the current position, information of the user destination if it is set up, and route information to the user destination if it is set up, from the navigation program 100, in step 3.

That is, since the navigation program 100 sets up the information of the user destination and route information to the user destination by having a talk with the user aboard the car 1, the navigation program 100 obtains the information when they are set up.

Then, the traffic information obtaining program 102 designates the obtained information, and transmits the request for providing traffic information to the traffic information providing system 2, in step 4. Then, traffic information is returned in response to the providing request from the traffic information providing system 2 while waiting for the return, in step 5. Finally, the traffic information obtaining program 102 receives the transmitted traffic information, and outputs the received traffic information to the display 23 and loud speaker 26, in step 6.

On the other hand, in case it is found that the user has issued the request for providing traffic information, next, the traffic information obtaining program 102 judges whether instruction for obtaining information from the user is included in the request for providing traffic information, in step 7. In case it is found that the instruction for obtaining information is included, the traffic information obtaining program 102 obtains information of the current position, information of the user destination, and route information to the user destination, from the navigation program 100 in accordance with the instruction for obtaining information from the user, in step 8.

Then, the traffic information obtaining program 102 designates the obtained information, and transmits the request for providing traffic information to the traffic information providing system 2, in step 4. Then, traffic information is returned in response to the providing request from the traffic information providing system 2 while waiting for the return, in step 5. Finally, the traffic information obtaining program 102 receives the transmitted traffic information, and outputs the received traffic information to the display 23 and loud speaker 26, in step 6.

In case it is found that the instruction for obtaining information from the user is not included in the request for providing traffic information, in step 7, the traffic information obtaining program 102 obtains information of the current position, information of the user destination if it is set up, and route information to the user destination if it is set up, from the navigation program 100, in step 3.

Then, the traffic information obtaining program 102 designates the obtained information, and transmits the request for providing traffic information to the traffic information providing system 2, in step 4. Then, traffic information is returned in response to the providing request from the traffic information providing system 2 while waiting for the return, in step 5. Finally, the traffic information obtaining program 102 receives the transmitted traffic information, and outputs the received traffic information to the display 23 and loud speaker 26, in step 6.

Accordingly, the traffic information obtaining program 102 obtains information of the current position, information of the user destination, and route information to the user destination, from the navigation program 100. Then, the traffic information obtaining program 102 designates the information and transmits the request for providing traffic information to the traffic information providing system 2, and receives the traffic information returned in response to the providing request, and finally outputs the received traffic information.

In case processing of the traffic information providing program 201 of the traffic information providing system 2 is performed under a flow chart shown in FIG. 8A, on receiving the request for providing traffic information, at first, the traffic information providing program 201 specifies the information designated by the request for providing traffic information (information of the current position, information of the user destination, and route information to the user destination), in step 1. Next, the traffic information providing program 201 finds out traffic information of positions near the specified information from traffic information managed by the traffic information data base 200, in step 2. Finally, the traffic information providing program 201 returns only the found out traffic information to the traffic information obtaining program 102 which issued the request for providing traffic information, in step 3.

In case processing of the traffic information providing program 201 of the traffic information providing system 2 is performed under a flow chart shown in FIG. 8B, on receiving the request for providing traffic information, at first, the traffic information providing program 201 specifies the information designated by the request for providing traffic information (information of the current position, information of the user destination, and route information to the user destination), in step 1. Next, the traffic information providing program 201 gives high priority to traffic information of positions near the specified information among traffic information managed by the traffic information data base 200, and decides the priority of the traffic information, in step 2. Finally, the traffic information providing program 201 returns the traffic information managed by the traffic information data base 200 in order of the priority to the traffic information obtaining program 102 which issued the request for providing traffic information, in step 3.

At this time, only traffic information of higher priority may be returned, while traffic information of lower priority not being returned.

On receiving the returned traffic information, the traffic information obtaining program 102 of the car navigation apparatus 10 can obtain traffic information of positions near the current position of the car 1 selectively or according to the priority, and can obtain traffic information of positions near the user destination of the car 1 selectively or according to the priority, and can obtain traffic information of positions near the route to the user destination of the car 1 selectively or according to the priority, and thus can output the information to the display 23 and loud speaker 26.

As in the above, the car navigation apparatus according to the present invention obtains the DGPS correction data from a base station nearest the car in two-way radio communication instead of obtaining the DGPS correction data by receiving the FM broadcasting. So, the car navigation apparatus can promptly obtain the DGPS correction data when necessary, which is capable of correcting a car position with high accuracy. Accordingly, the current position of the car can always be detected with high accuracy.

Furthermore, the car navigation apparatus according to the present invention obtains traffic information by having access to a traffic information providing system in two-way radio communication instead of obtaining traffic information by receiving the FM broadcasting. So, the car navigation apparatus can promptly obtain traffic information when necessary.

Furthermore, with the traffic information providing apparatus according to the present invention being provided, the car navigation apparatus according to the present invention can obtain necessary traffic information promptly since the car navigation apparatus can obtain traffic information selectively or according to the priority in accordance with circumstances a car is facing.

What is claimed is:

1. An on-vehicle navigation apparatus that detects and corrects a current position of a motor vehicle by the use of radio communication, comprising:

detection means for detecting a preliminary current position of the vehicle;

a CPU processing device for detecting at least one base station out of base stations near the detected preliminary current position of the vehicle using information of positions of a plurality of base stations which have been registered in map data in advance;

a radio transmitting device for transmitting a correction data request to the base station detected by the CPU processing device; and a radio receiving device for receiving, in response to said request, correction data transmitted from the detected base station;

wherein a corrected current position of the vehicle is generated by correcting the preliminary current position using the correction data received by the radio receiving device.

2. The apparatus of claim 1 wherein said preliminary current position of the vehicle is detected via GPS information received by the navigation apparatus, and said correction data is correction data of the differential-GPS.

3. An on-vehicle navigation apparatus that detects and corrects a current position of a motor vehicle by the use of radio communication, comprising:

detection means for detecting a preliminary current position of the vehicle;

processing means for detecting at least one base station out of base stations near the detected preliminary current position of the vehicle using information of positions of a plurality of base stations which have been registered in map data in advance;

radio transmitting means for transmitting a correction data request to the base station detected by the processing means; and radio receiving means for receiving, in response to said request, correction data transmitted from the detected base station;

wherein a corrected current position of the vehicle is generated by correcting the preliminary current position using the correction data received by the radio receiving means.

4. The apparatus of claim 3 wherein said preliminary current position of the vehicle is detected via GPS information received by the navigation apparatus, and said correction data is correction data of the differential-GPS.

5. A method for use in an on-vehicle navigation apparatus for detecting and correcting a current position of a motor vehicle, said method comprising the steps of:

detecting a preliminary current position of the vehicle;

detecting at least one base station out of base stations near the detected preliminary current position of the vehicle using information of positions of a plurality of base stations which have been registered in map data in advance;

transmitting a correction data request to the detected base station;

receiving, in response to said request, correction data transmitted from the detected base station; and generating a corrected current position of the vehicle by correcting the preliminary current position using the received correction data.

6. The method of claim 5 wherein said preliminary current position of the vehicle is detected via GPS information received by the navigation apparatus, and said correction data is correction data of the differential-GPS.

7. A program recording medium for an on-vehicle navigation apparatus, said recording medium having recorded thereon a program to be executed by processing means of said apparatus to implement a method for detecting and correcting a current position of a motor vehicle, said method comprising the steps of:

detecting a preliminary current position of the vehicle;

detecting at least one base station out of base stations near the preliminary current position of the vehicle using information of positions of a plurality of base stations which have been registered in map data in advance;

transmitting a correction data request to the detected base station;

receiving, in response to said request, correction data transmitted from the detected base station; and generating a corrected current position of the vehicle by correcting the preliminary current position using the received correction data.

8. The program recording medium of claim 7 wherein said preliminary current position of the vehicle is detected via GPS information received by the navigation apparatus, and said correction data is correction data of the differential-GPS.

* * * * *